United States Patent [19]
Eagle

[11] 3,869,970
[45] Mar. 11, 1975

[54] ELECTRIC TOASTERS
[75] Inventor: John Scott Eagle, Stamford, England
[73] Assignee: British Domestic Appliances Limited, Peterborough, England
[22] Filed: Nov. 29, 1972
[21] Appl. No.: 310,410

[30] Foreign Application Priority Data
Nov. 30, 1971 Great Britain.................. 55509/71

[52] U.S. Cl.................... 99/329 R, 99/337, 99/393
[51] Int. Cl. ........................................... A47j 37/08
[58] Field of Search ............ 99/326, 327, 328, 329, 99/331, 332, 333, 334, 335, 391, 393, 385, 337, 338

[56] References Cited
UNITED STATES PATENTS
2,631,523  3/1953  Olving.................................. 99/326
2,631,524  3/1953  Theisen................................ 99/328

Primary Examiner—Billy J. Wilhite
Attorney, Agent, or Firm—Kirschstein, Kirschstein, Ottinger & Frank

[57] ABSTRACT

An electric toaster having a bread carriage which moves the bread downwards until it is halted in front of a heating element by stop members. Additional movement of the bread carriage beyond the stop members operates a switch for energising the heating element. The bread carriage is moved upwards automatically when the bread has been toasted to a predetermined degree so that the switch de-energises the heating element before the bread carriage engages the bread to lift it from the stop members. Therefore the bread cannot smoulder or burst into flames if it twists or curls and jams the bread carriage.

11 Claims, 9 Drawing Figures

ELECTRIC TOASTERS

This invention relates to electric toasters and has an important application to electric toasters in which the slice of bread being toasted is pushed out of the toaster automatically when it has been toasted to a predetermined degree.

Such electric toasters have the disadvantage that should the slice of bread twist or curl during toasting it may jam the mechanism which pushes it out of the toaster and therefore the bread stays in close proximity with the energised heating element and may smoulder or burst into flames before it can be extracted from the toaster.

An object of this invention is to provide an electric toaster which does not suffer from this disadvantage.

According to the present invention an electric toaster comprises means for supporting a slice of bread for movement towards electric heating means, stop means arranged to bring the bread to rest adjacent the heating means, switching means operable by movement of the support means beyond the position at which the bread is brought to rest and effective to complete an energising circuit for the heating means, and means adapted to return the support means to its original position automatically when the bread has been toasted to a predetermined degree and thereby cause the switching means to disconnect the energising circuit for the heating means before the support means engages the bread to move it away from the stop means.

The return movement of the support means to its original position may be brought about automatically by a timing device, by a temperature sensitive device responsive to the temperature of the toasting bread, or by a photoelectric device responsive to the colour of the bread.

The invention will now be described, by way of example, with reference to the accompanying drawings in which.

Figure 1:
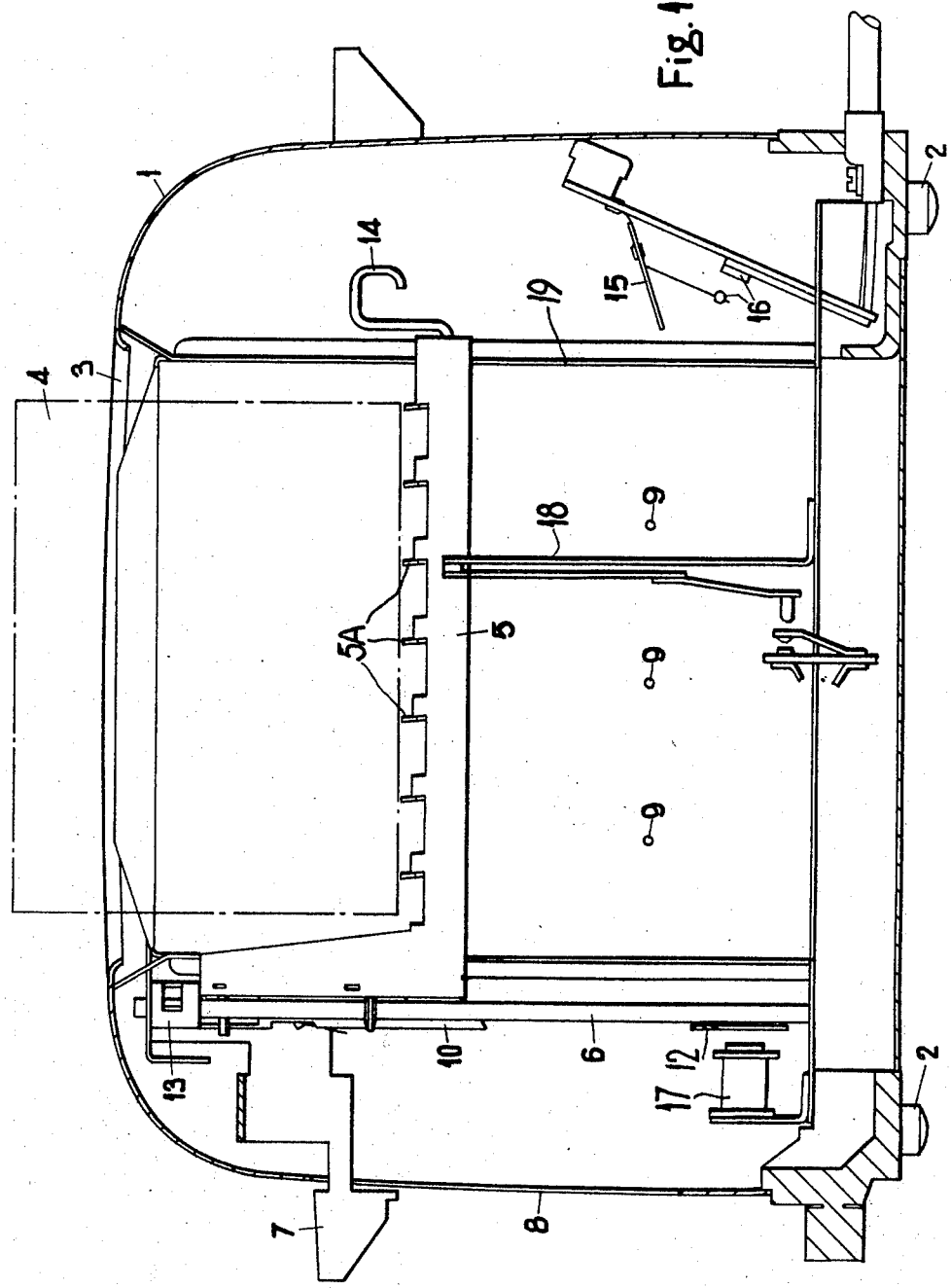
FIG. 1 is a side elevation, partly in section, of an electric toaster in accordance with the invention.
Figure 4:
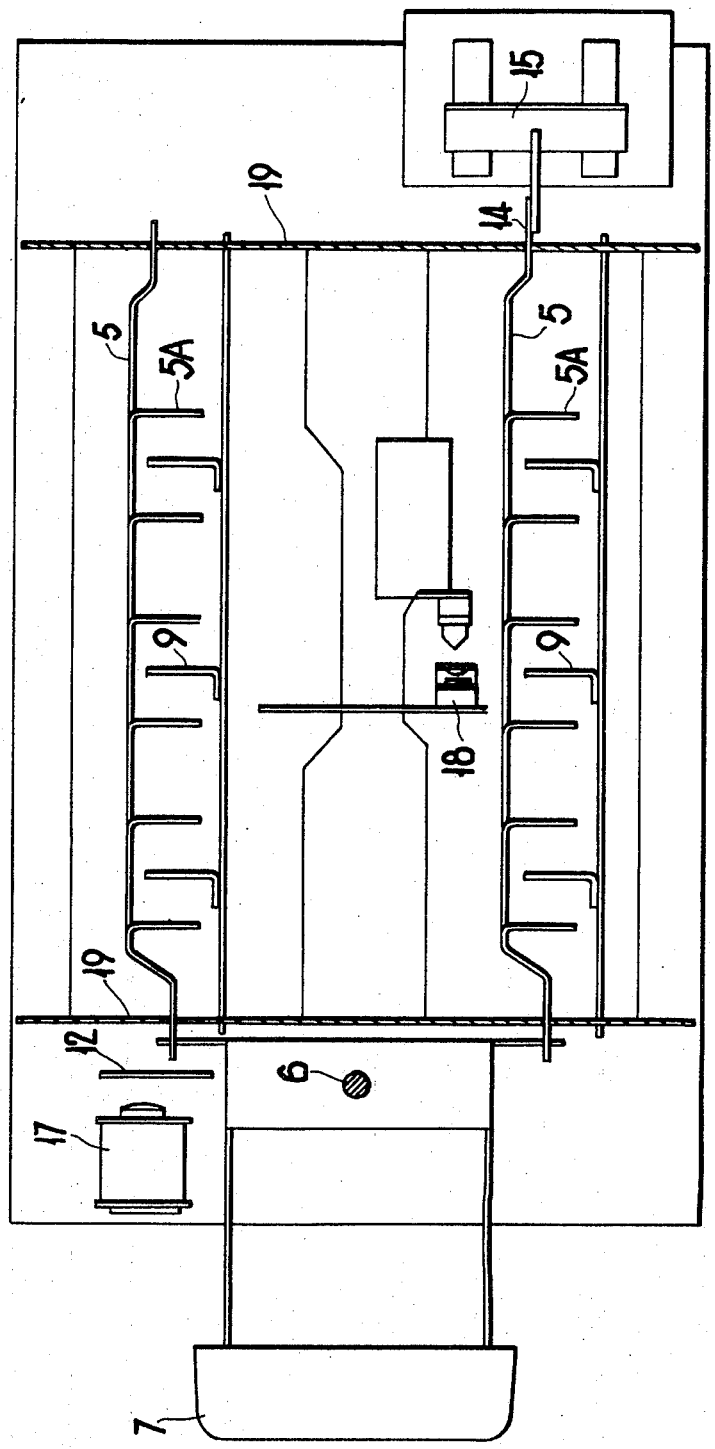
FIG. 4 is a plan view, partly in section, of the electric toaster with a casing removed.
Figure 5:
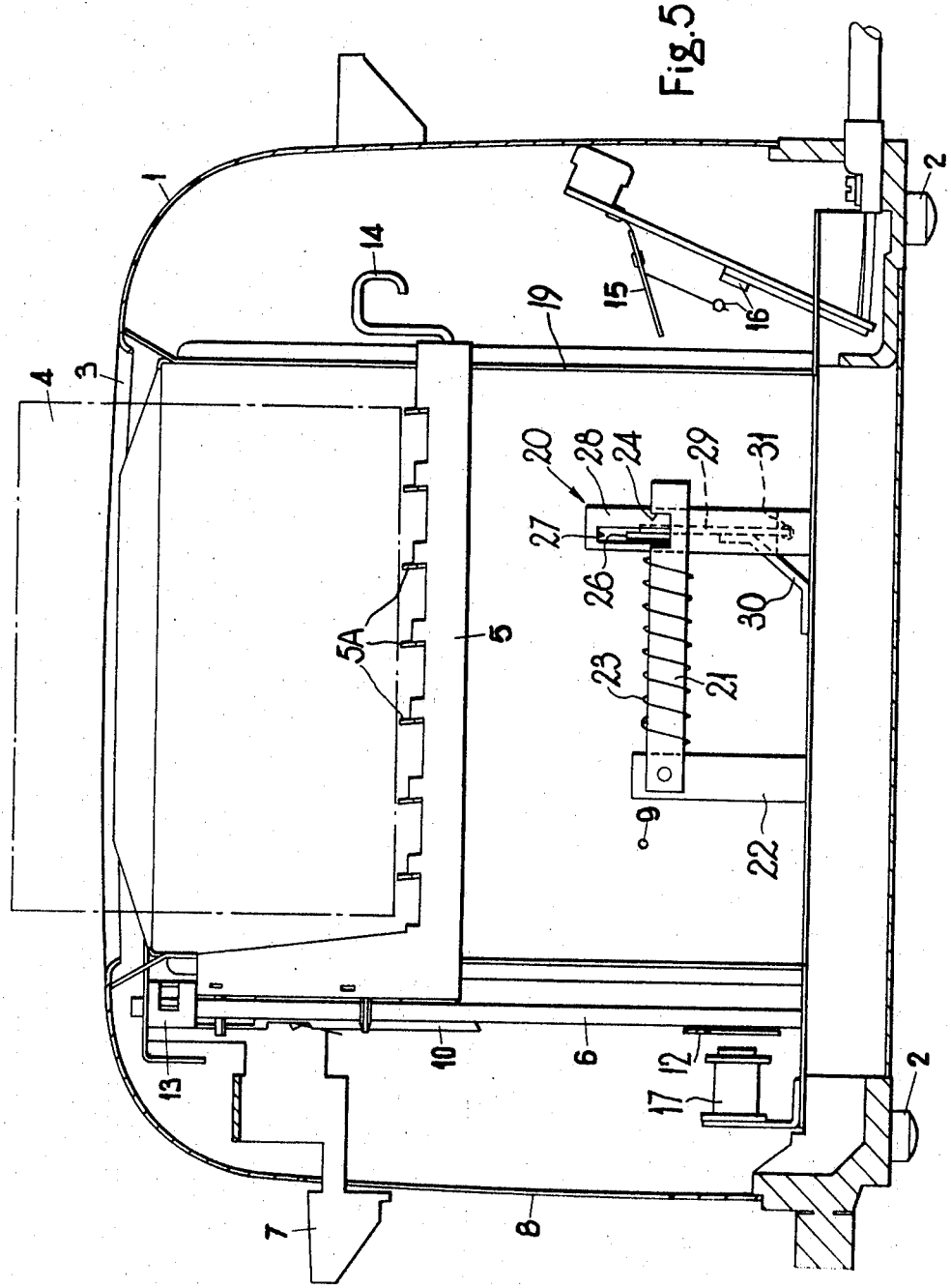
Figure 6:
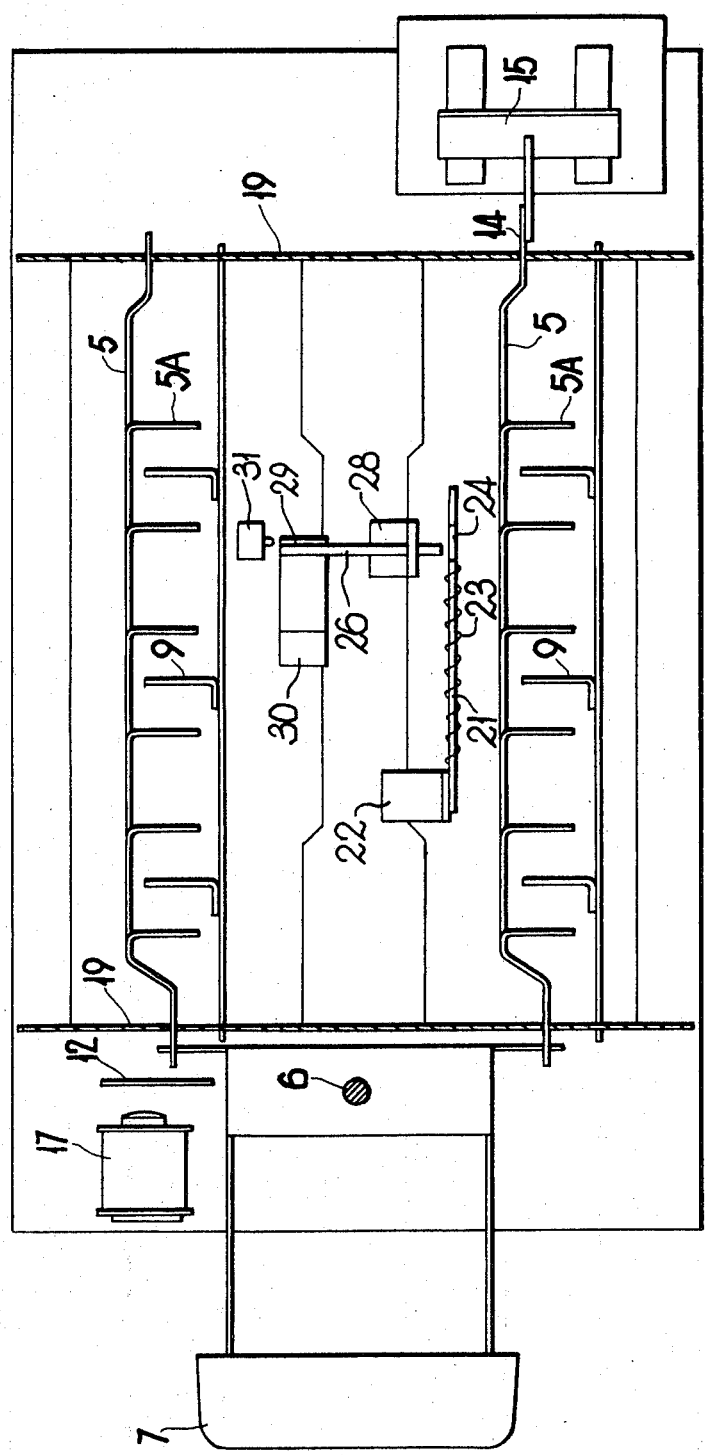
Figure 7:
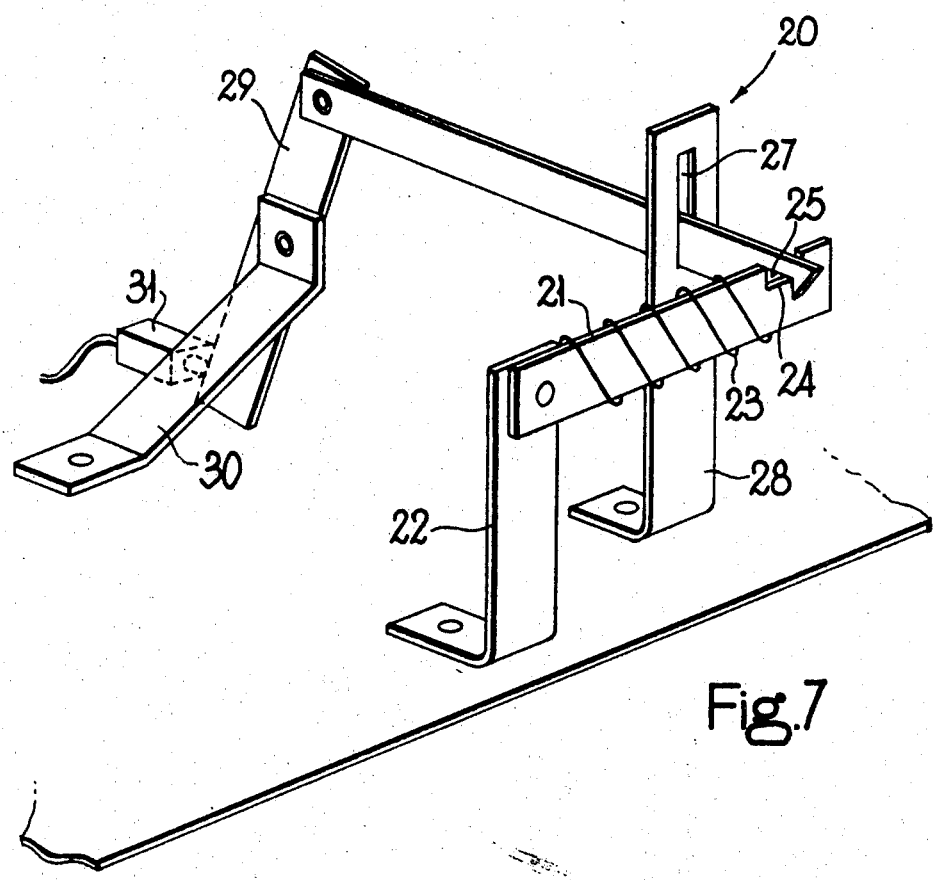
Figure 8:
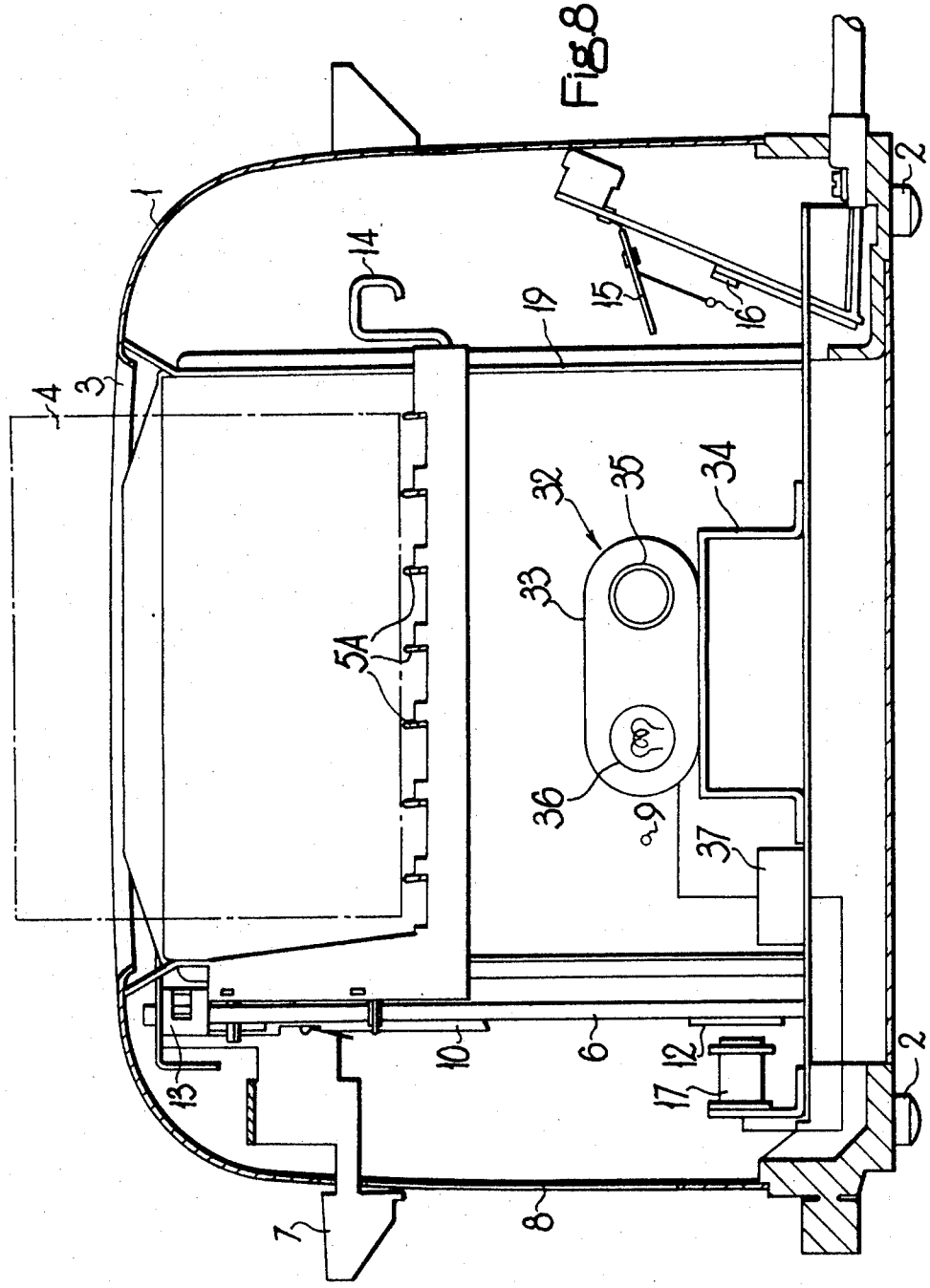
Figure 9:
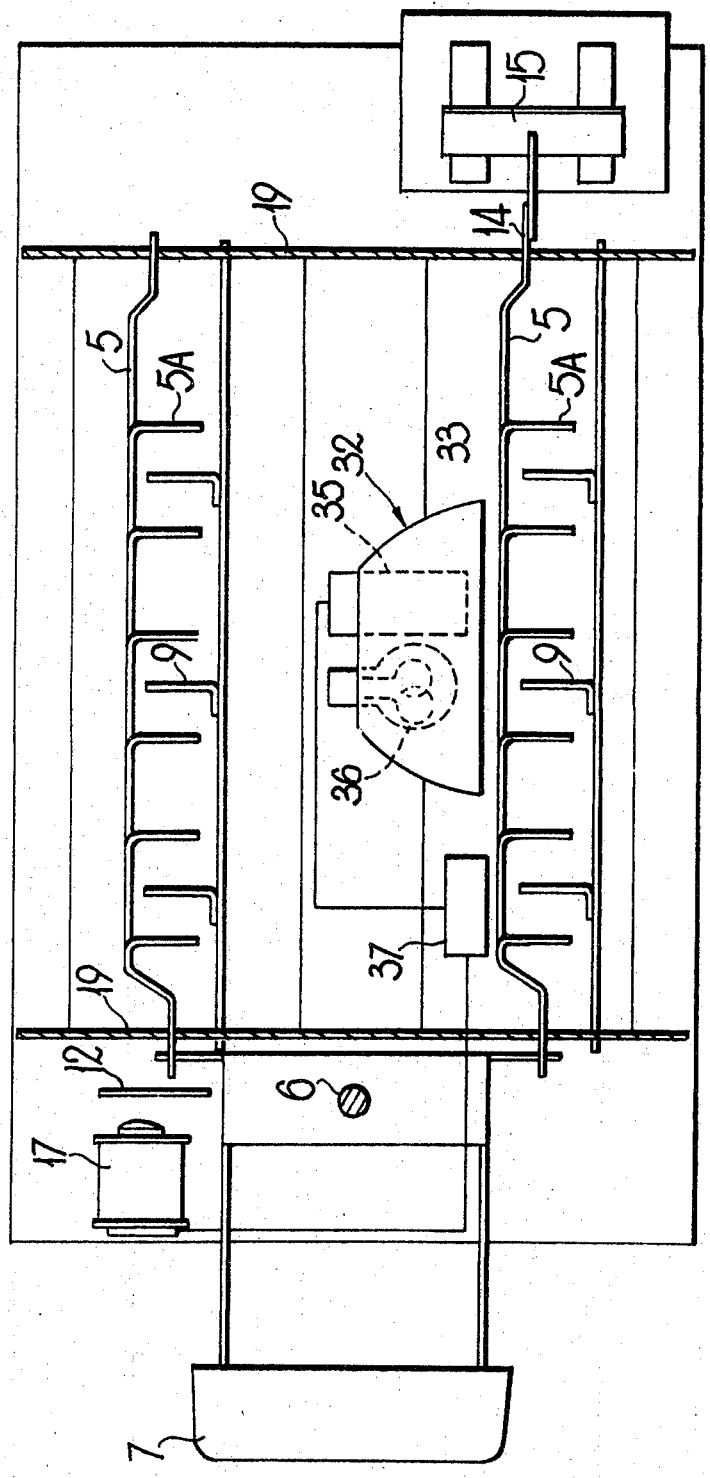

FIGS. 5 and 6 are views similar to FIGS. 1 and 4 but showing a timing device in place of the temperature sensitive device illustrated in FIGS. 1 and 4;

FIG. 7 is a fragmentary perspective view of the timing device shown in FIGS. 5 and 6; and FIGS. 8 and 9 are views similar to FIGS. 1 and 4 but showing a photo-electric device in place of the temperature sensitive device shown in FIGS. 1 and 4.

Referring to the drawings, the electric toaster comprises a casing 1 supported on a plurality of feet 2 and having two elongate openings 3 at the top through which slices of bread 4 can pass edgewise into the casing 1 which contains electric heating elements (not shown). Two carriages 5, each having a plurality of transversely extending fingers 5A suitably spaced to support a slice of bread 4 inserted through an opening 3, have their ends slidably mounted in vertically extending slots in transverse partitions 19 so that the slices of bread 4 can be moved downwards towards the heating elements. An operating knob 7, coupled to the carriages 5 and extending through a slot in one end 8 of the casing 1, is slidably mounted on a pillar 6 so that it can be depressed to lower the carriages 5 into the casing. A plurality of rods 9, extending transversely across the interior of the casing from opposite sides at spaced positions in the path of the slices of bread 4, act as stop members which engage the lower edge of each of the slices of bread 4, and bring them to rest facing the heating elements, the carriages 5 being capable of further downward movement beyond the positions of the rods 9. An arm 10 which is arranged to move downwards with the carriages 5 has a notch 11 in its lower end arranged to engage a latch 12 when the carriages are in their lowermost positions and to restrain the carriages 5 in these positions against upward pressure exerted by a return spring 13. An arm 14 mounted on one of the carriages 5 is arranged to operate a double-pole switch 15 having contacts 16 which are connected in the energising circuit of the electric heating element. An electromagnet 17 is arranged to release the latch 12 when energised by a device 18 arranged to operate when the bread has been toasted to a predetermined degree. The device 18 may be a timing device or a temperature sensitive device responsive to the temperature of the toasting bread.

Figure 2:
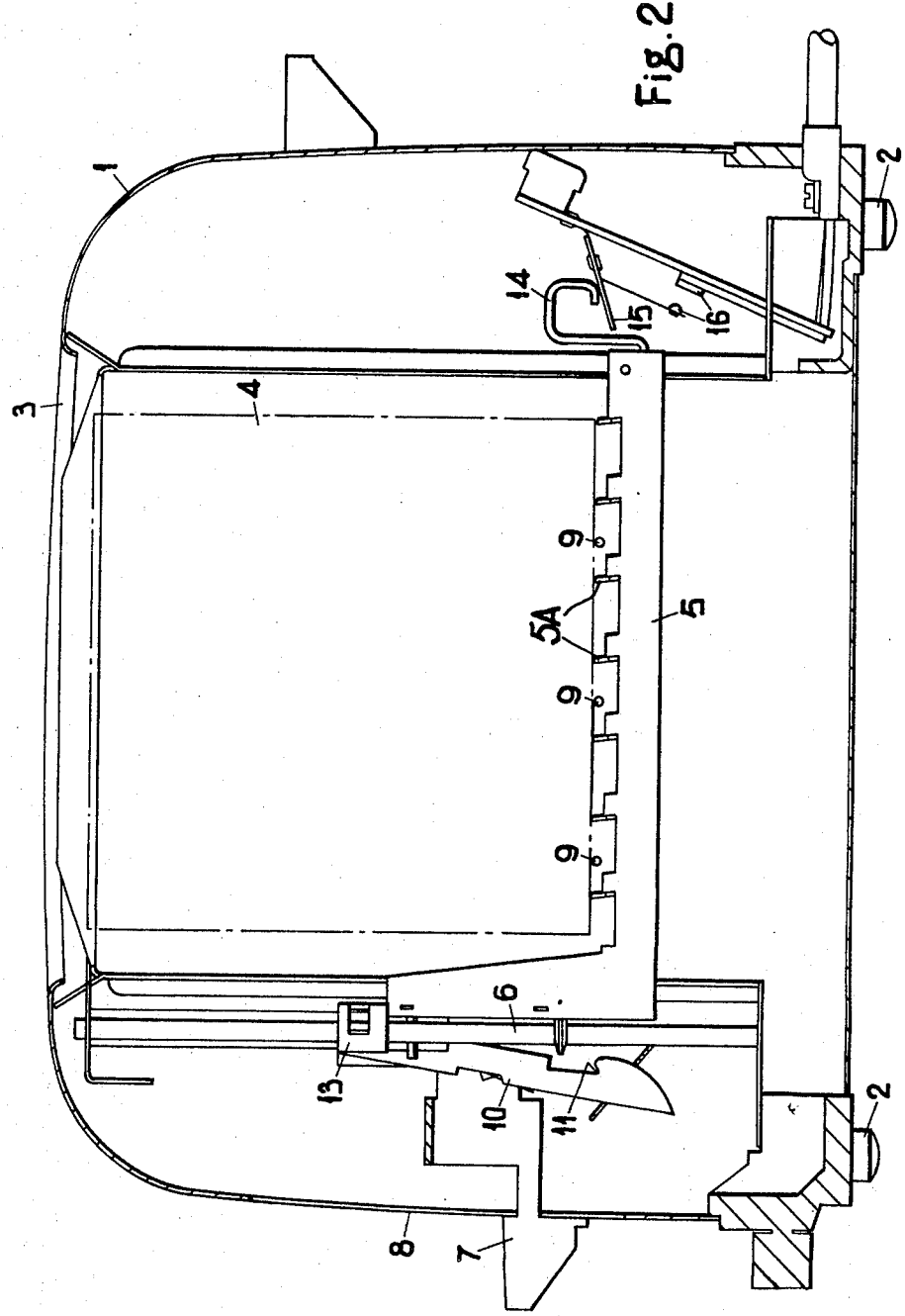
FIGS. 2 and 3 are side elevations, similar to FIG. 1, but showing parts of the toaster in different operative positions.
Figure 3:
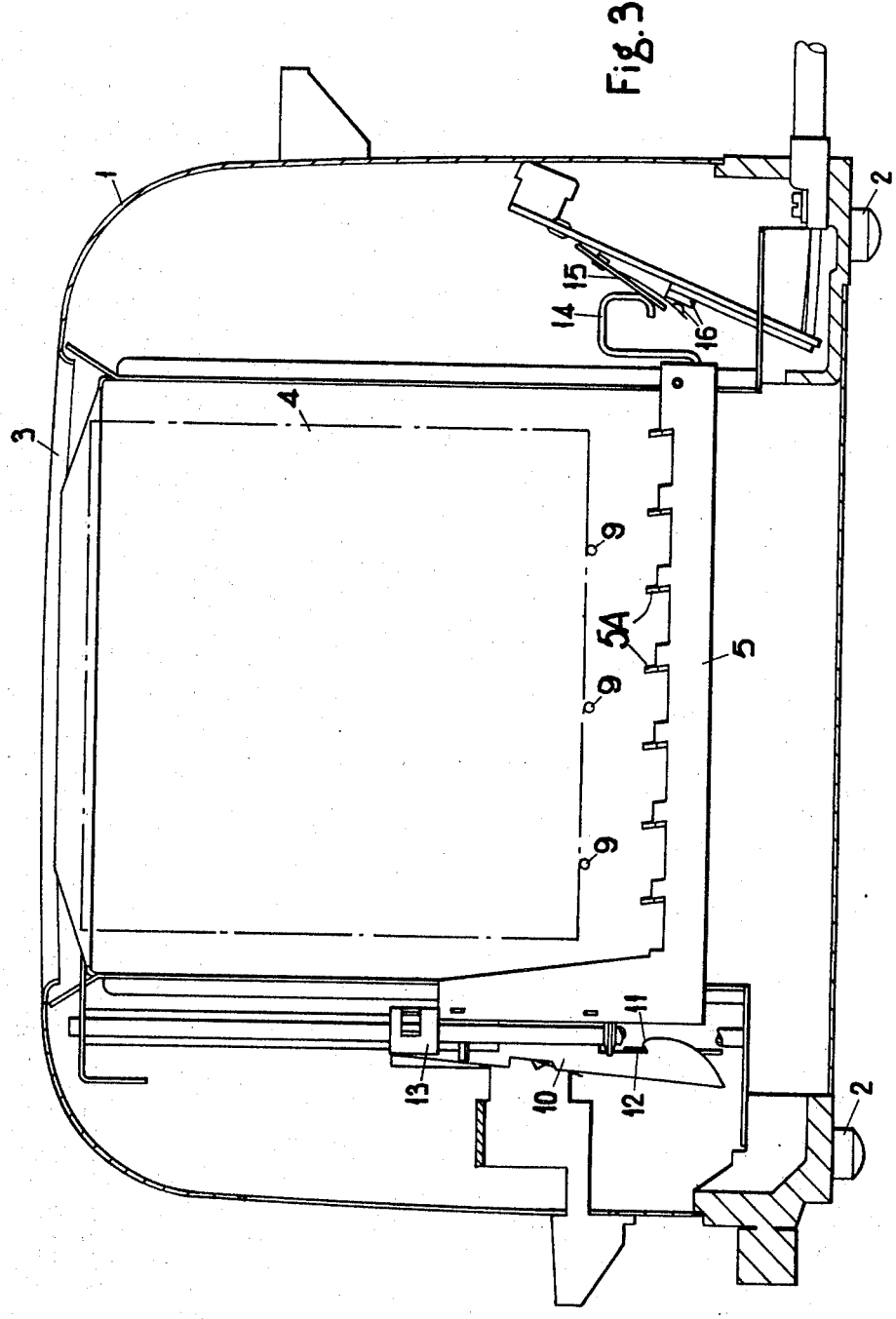

The electric toaster operates in the following manner. Slices of bread 4 are inserted through the openings 3 so that they rest on the fingers 5A of the carriages 5 (see FIG. 1), and the operating knob 7 is depressed to lower the carriages 5 until the lower edges of the slices of bread 4 engage the rods 9 (see FIG. 2). When in this position the slices of bread 4 are facing the heating elements which are not energised, since the contact 16 of the double pole switch 15 have not been closed by the arm 14. The operating knob 7 is then depressed further so that the carriages 5 are lowered to the position shown in FIG. 3, the fingers 5A passing between the rods 9, leaving the slices of bread 4 resting on the rods 9. Downward movement of the carriages 5 to this position causes the arm 14 to engage the double-pole switch 15 closing its contacts 16 and thereby energising the heating elements. The carriages 5 are locked in this position by the latch 12 which engages in the notch 11 in the arm 10. When the bread has been toasted to a predetermined degree, release of the latch 12 is brought about by the electromagnet 17 which is operated automatically by the device 18. The device 18 may be a temperature sensitive device responsive to the temperature of the toasting bread (as shown) or may be, a timing device which can be set to toast the bread for a predetermined period or may be a photo-electric device responsive to the colour of the bread.

The timing device (see FIGS. 5–7) includes a bimetallic element 21 supported at one end by a bracket 22. An electrical resistance heating element 23 is wound around the bimetallic element 21. A notch 24 at the free end of the bimetallic element 21 cooperates with a similar notch 25 at an end of latch member 26 that extends through a slot 27 in a supporting bracket 28. The other end of the latch member 26 is pivotally supported by the upper end of a lever 29, the midpoint of which is pivotally mounted on a bracket 30. The lower end of lever 29 is arranged to engage the operating plunger of switch 31 connected in the energizing circuit of the electromagnet 17. FIGS. 5 and 6 show the timing device in its original position which is prior to the insertion of bread. FIG. 7 shows the timing device at the end of the toasting period just prior to ejection of the toast.

As to how the timing device operates, the heating element 23 is energized when the bread carriage 5 is depressed and the bimetallic element 21 is heated and deflects so that the notch 24 engages the notch 25 and pulls the latch member 26 through the slot 27 thereby operating a switch (not shown) which de-energizes the heating element 23. As the bimetallic element 21 cools down it deflects back to its original position moving the latch member 26 with it. The return movement of the latch member 26 causes the lever 29 to pivot about its midpoint. The lower end of the lever 29 operates the switch 31 and energizes the electromagnet 17 which releases the latch 12 and allows the bread carriage 5 to return to its original position. Thus the heating up and cooling down of the bimetallic element 21 governs the duration of the toasting period. The return of the bread carriage 5 to its original position trips the free end of the latch member 26, unlatching the notches 24 and 25 and allowing the lever to release the switch 31 in preparation for the next toasting operation.

Referring now to FIGS. 8 and 9, the photo-electric device indicated generally at 32 includes a reflector 33 which is mounted on a support 34 and has located within it a selenium photo-electric cell 35 and an electric lamp 36. The photo-electric cell 35 is connected to a transistor amplifier 37 the output of which is applied to the electromagnet 17.

In use of the toaster, light from the electric lamp 36 falls on the toast and is reflected back on the photo-electric cell 35 which produces an output signal which is fed to the amplifier 37. When the output signal from the photo-electric cell falls to a predetermined level due to the browning of the toast, the change in output from the amplifier causes the electromagnet 17 to release the latch 12 so that the bread carriage 5 returns to its original position.

The latch 12 may also be arranged to be released manually so that the toasting operation can be terminated prematurely should this become necessary.

When the latch 12 is released by the electromagnet 17 the carriages 5 are urged upwards by the return spring 13 so that the arm 14 disengages the double-pole switch 15 allowing its contacts 16 to open and de-energise the heating elements. The fingers 5A of the carriages 5 then engage the lower edges of the slices of bread 4, lifting them from the rods 9 and returning them to their original positions in which they project through the openings 3 and can easily be removed from the toaster. If one of the slices of bread 4 has become curled or twisted during toasting, so that it prevents the upward movement of the carriages 5, there is no danger of the slices of bread burning or bursting into flames since the contacts 16 will have been opened and the heating element de-energised before the fingers 5A of the carriages 5 engage the lower edges of the slices of bread. Moreover with the heating elements disconnected from the electrical supply by the contacts 16 of the double-pole switch 15, the curled or twisted bread can safely be extracted from the casing 1.

I claim:
1. An electric toaster comprising;
   a. electric heating means;
   b. means for supporting a slice of bread for movement from an original position out of proximity with the electric heating means to a toasting position adjacent the electric heating means, said supporting means having portions which engage the bread and spaces between said portions;
   c. stop means having portions positioned to engage the bread and bring it to rest in the toasting position, which portions are spaced apart to permit said portions of the support means to pass between them for further movement after the bread has been brought to rest and is supported in the toasting position by the stop means;
   d. switch contacts operable by said further movement of the portions of the support means beyond the position at which the bread is brought to rest and effective to complete an energizing circuit for the electric heating means; and
   e. means adapted to return the support means automatically towards the original position in which the bread is out of proximity with the electric heating means when the bread has been toasted to a predetermined degree, and thereby cause the switch contacts to disconnect the energizing circuit for the electric heating means before the portions of the support means engage the bread to move it away from the stop means.

2. An electric toaster as claimed in claim 1, including a timing device arranged to bring about the return of the support means to its original position automatically when the bread has been toasted for a predetermined period.

3. An electric toaster as claimed in claim 1, wherein the return of the support means to its original position is brought about automatically by a temperature sensitive device responsive to the temperature of the bread.

4. An electric toaster as claimed in claim 1, wherein the portions of the support means include a plurality of transversely extending members arranged to engage an edge of the bread, and to pass between spaced members forming the portions of the stop means and disengage the edge of the bread before the switching means are operated to complete the energizing circuit.

5. An electric toaster as claimed in claim 1, wherein the stop means comprise a plurality of transversely extending members at spaced positions in the path of the bread.

6. An electric toaster as claimed in claim 1, including latch means arranged to hold the support means in a position in which the switching means are operated to complete the energising circuit.

7. An electric toaster as claimed in claim 6, wherein an electromagnet is arranged to release the latch means when the bread has been toasted to a predetermined degree.

8. An electric toaster as claimed in claim 1, wherein the support means is slidably mounted for movement between the original position and the position in which the swtiching means are operated to complete the energising circuit of the electric heating means.

9. An electric toaster as claimed in claim 1, wherein the bread is inserted in a slot in the top of a casing and the support means is arranged to move downwards into the casing.

10. An electric toaster as claimed in claim 1, wherein the support means is urged towards its original position by spring means.

11. An electric toaster as claimed in claim 1, wherein the return of the support means to its original position is brought about automatically by a photo-electric device reponsive to the colour of the bread.

* * * * *